(12) United States Patent
Korcharz et al.

(10) Patent No.: US 7,759,882 B2
(45) Date of Patent: Jul. 20, 2010

(54) COLOR CONTROL FOR SCANNING BACKLIGHT

(75) Inventors: Dror Korcharz, Bat Yam (IL); Alon Ferentz, Bat Yam (IL); Arkadiy Peker, New Hyde Park, NY (US)

(73) Assignee: Microsemi Corp.—Analog Mixed Signal Group Ltd., Hod Hasharon (IL)

( * ) Notice: Subject to any disclaimer, the term of this patent is extended or adjusted under 35 U.S.C. 154(b) by 62 days.

(21) Appl. No.: 11/778,093

(22) Filed: Jul. 16, 2007

(65) Prior Publication Data

US 2008/0024076 A1 Jan. 31, 2008

Related U.S. Application Data

(60) Provisional application No. 60/820,808, filed on Jul. 31, 2006.

(51) Int. Cl.
H05B 37/00 (2006.01)
(52) U.S. Cl. .................................................. 315/312
(58) Field of Classification Search ................ 315/291, 315/307, 185 R, 312, 313, 315; 345/204–205, 345/207, 690, 696, 698–699, 45–46, 48; 362/800
See application file for complete search history.

(56) References Cited

U.S. PATENT DOCUMENTS

| | | | |
|---|---|---|---|
| 5,387,921 A | 2/1995 | Zhang et al. | |
| 6,411,046 B1 * | 6/2002 | Muthu | 315/309 |
| 6,441,558 B1 | 8/2002 | Muthu et al. | |
| 6,611,249 B1 * | 8/2003 | Evanicky et al. | 345/102 |
| 6,870,525 B2 | 3/2005 | Kawabata et al. | |
| 6,930,737 B2 * | 8/2005 | Weindorf et al. | 349/96 |
| 6,995,355 B2 * | 2/2006 | Rains et al. | 250/228 |
| 7,001,059 B2 * | 2/2006 | Han et al. | 362/616 |
| 7,052,138 B2 * | 5/2006 | Matsui | 353/31 |
| 7,255,462 B2 * | 8/2007 | Tseng | 362/330 |
| 7,315,288 B2 * | 1/2008 | Livingston et al. | 343/770 |
| 7,348,949 B2 * | 3/2008 | Lee et al. | 345/83 |
| 2005/0212459 A1 | 9/2005 | Patel et al. | |
| 2005/0279949 A1 * | 12/2005 | Oldham et al. | 250/458.1 |
| 2006/0007108 A1 * | 1/2006 | Utsumi et al. | 345/102 |
| 2006/0038769 A1 | 2/2006 | Marra et al. | |
| 2006/0132423 A1 | 6/2006 | Travis | |
| 2006/0221047 A1 | 10/2006 | Tanizoe et al. | |
| 2008/0203273 A1 * | 8/2008 | Deurenberg | 250/201.1 |

FOREIGN PATENT DOCUMENTS

| | | |
|---|---|---|
| WO | 2004084170 A1 | 9/2004 |
| WO | 2005111976 A1 | 11/2005 |
| WO | 2006070323 A1 | 7/2006 |

* cited by examiner

*Primary Examiner*—Douglas W Owens
*Assistant Examiner*—Minh D A
(74) *Attorney, Agent, or Firm*—Simon Kahn (57) ABSTRACT

A backlighting system comprising: a color manager; a plurality of luminaires, each of the luminaires comprising a LED string and arranged to illuminate a particular portion of a display associated therewith; a color sensor arrange to receive light from one of the luminaires; and a plurality of thermal sensors each associated with a particular luminaire and in communication with the color manager, the plurality of thermal sensors being less than the plurality of luminaires, the color manager, responsive to the plurality of thermal sensors and the color sensor, being operable to calculate color coordinates for each of the plurality of luminaires.

26 Claims, 5 Drawing Sheets

Fig. 1

*Prior Art*

COLOR CONTROL FOR SCANNING BACKLIGHT

CROSS-REFERENCE TO RELATED APPLICATION

This application claims priority from U.S. Provisional Patent Application Ser. No. 60/820,808 filed Jul. 31, 2006, entitled "Color Control for Scanning Backlight", the entire contents of which is incorporated herein by reference.

BACKGROUND OF THE INVENTION

The present invention relates to the field of light emitting diode based lighting and more particularly to a means of using a reduced number of color and thermal sensors in a scanning backlight.

Light emitting diodes (LEDs) and in particular high intensity and medium intensity LED strings are rapidly coming into wide use for lighting applications. LEDs with an overall high luminance are useful in a number of applications including backlighting for liquid crystal display (LCD) based monitors and televisions, collectively hereinafter referred to as a matrix display. In a large LCD matrix display typically the LEDs are supplied in one or more strings of serially connected LEDs, thus sharing a common current.

In order supply a white backlight for the matrix display one of two basic techniques are commonly used. In a first technique one or more strings of "white" LEDs are utilized, the white LEDs typically comprising a blue LED with a phosphor which absorbs the blue light emitted by the LED and emits a white light. In a second technique one or more individual strings of colored LEDs are placed in proximity so that in combination their light is seen a white light. Often, two strings of green LEDs are utilized to balance one string each of red and blue LEDs.

In either of the two techniques, the strings of LEDs are in one embodiment located at one end or one side of the matrix display, the light being diffused to appear behind the LCD by a diffuser. In another embodiment the LEDs are located directly behind the LCD, the light being diffused so as to avoid hot spots by a diffuser. In the case of colored LEDs, a further mixer is required, which may be part of the diffuser, to ensure that the light of the colored LEDs are not viewed separately, but are rather mixed to give a white light. The white point of the light is an important factor to control, and much effort in design in manufacturing is centered on the need for a correct white point.

Each of the colored LED strings is typically intensity controlled by both amplitude modulation (AM) and pulse width modulation (PWM) to achieve an overall fixed perceived luminance. AM is typically used to set the white point produced by the disparate colored LED strings by setting the constant current flow through the LED string to a value achieved as part of a white point calibration process and PWM is typically used to variably control the overall luminance, or brightness, of the monitor without affecting the white point balance. Thus the current, when pulsed on, is held constant to maintain the white point among the disparate colored LED strings, and the PWM duty cycle is controlled to dim or brighten the backlight by adjusting the average current. The PWM duty cycle of each color is further modified to maintain the white point, preferably responsive to a color sensor. The color sensor is arranged to receive the white light, and thus a color control feedback loop may be maintained. It is to be noted that different colored LEDs age, or reduce their luminance as a function of current, at different rates and thus the PWM duty cycle of each color must be modified over time to maintain the white point.

One known problem of LCD matrix displays is motion blur. One cause of motion blur is that the response time of the LCD is finite. Thus, there is a delay from the time of writing to the LCD pixel until the image changes. Furthermore, since each pixel is written once per scan, and then is held until the next scan, smooth motion is not possible. The eye notices the image being in the wrong place until the next sample, and interprets this as blur or smear.

This problem is resolved by a scanning backlight, in which the matrix display is divided horizontally into a plurality of regions, and the backlight for each region is illuminated for a short period of time in synchronization with the writing of the image. Ideally, the backlighting for the region is illuminated just after the pixel response time, and the illumination is held for a predetermined illumination frame time.

In a preferred embodiment, each region is provided with optical partitions to prevent spillover of illumination from one region to an adjacent region, and the regions are stacked horizontally. Thus, in an embodiment in which colored LED strings are supplied, the color for each region must be controlled. U.S. Pat. No. 6,870,525 issued Mar. 22, 2005 to Kawabata et al., the entire contents of which is incorporated herein by reference, teaches a separate light sensitive element for each region. Such a method is quite costly in the case of LED backlighting, as a separate color sensor will then be required for each region.

World Intellectual Property Organization International Publication S/N WO 2005/111976 published Nov. 24, 2005 to Fisekovic et al, the entire contents of which is incorporated herein by reference, is addressed to a scanning backlight for a matrix display. A sensing signal responsive to a plurality of lighting sources is supplied, the sensing signal being sampled at different times in coordination with the scanning period. Thus, a single sensor is responsive to a plurality of lighting sources. Unfortunately, as the effectiveness of optical partitions improve, thereby improving the operation of the scanning backlight and the matrix display as a whole, such a single sensor will not receive sufficient light from adjacent regions to be efficient.

U.S. Pat. No. 6,411,046 to Muthu issued Jun. 25, 2002, the entire contents of which is incorporated herein by reference, is addressed to a method of controlling the light output and color of LEDs in a luminaire by measuring color coordinates for each LED light source at different temperatures, storing the expressions of the color coordinates as a function of the temperatures, deriving equations for the color coordinates as a function of temperature, calculating the color coordinates and lumen output fractions on-line, and controlling the light output and color of the LEDs based upon the calculated color coordinates and lumen output fractions.

What is needed, and not provided by the prior art, is a means for controlling the color of a plurality of LED backlighting strings separated by optical partitions without requiring a separate color sensor and thermal sensor for each region.

SUMMARY OF THE INVENTION

Accordingly, it is a principal object of the present invention to overcome the disadvantages of prior art. This is provided in the present invention by a backlighting system exhibiting a plurality of luminaires arranged in a plurality of horizontally arranged regions. Each of the luminaires comprises LED strings of a plurality of colors which in combination produce a white light. Optical partitions are further provided horizontally to limit any light spillover from a region to an adjacent region. A color sensor is provided, the number of color sensors being less than the number of regions. At least two thermal sensors are further provided, the number of thermal sensors being less than the number of regions. In an exemplary embodiment a thermal sensor is provided for the top region and the bottom region.

A color manager receives the output of the color sensor and the thermal sensors, and in response controls the driving signals for the luminaires responsive. In one embodiment the color manager calculates the temperature for each of the regions based on the provided thermal sensors, with the temperature of regions not provided with a thermal sensor being interpolated from the provided thermal sensors.

Thus, in an exemplary embodiment a single color sensor and two thermal sensors are provided, the two thermal sensors providing an indication of the bottom region and the top region respectively.

The invention provides for a backlighting system comprising: a color manager; a plurality of luminaires, each of the luminaires comprising a plurality of colored LED strings and arranged to illuminate a particular portion of a display associated therewith; a color sensor arranged to receive light from one of the plurality of luminaires; and a plurality of thermal sensors in communication with the color manager, each of the thermal sensors secured at a particular location relative to the plurality of luminaires, the plurality of thermal sensors being fewer than the plurality of luminaires; the color manager, responsive to the plurality of thermal sensors and the color sensor, being operable to control a drive signal of each of the plurality of luminaires so as to maintain a uniform color.

In one embodiment the color manager is further operable to calculate a temperature for at least one of the plurality of luminaires, the controlled drive signal being responsive to the estimated temperature. In another embodiment at least one of the plurality of thermal sensors is associated with a particular luminaire. Preferably, the color sensor receives light from the particular luminaire having associated therewith the at least one thermal sensor.

In one embodiment the backlighting system further comprises a plurality of optical partitions each arranged between two of the plurality of luminaires so as to reduce optical interaction between a first of the two luminaires and the display portion associated with a second of the two luminaires. In another embodiment each of the plurality of luminaires is arranged horizontally, the plurality of luminaires being stacked vertically. In one further embodiment the particular location of one of the plurality of thermal sensors is associated with a top one of the horizontally arranged stacked plurality of luminaires. In another further embodiment the particular location of one of the plurality of thermal sensors is associated with a bottom one of the horizontally arranged stacked plurality of luminaires.

In one embodiment the backlighting system further comprises a chassis arranged to secure the plurality of luminaires, wherein the particular location of a first one of the plurality of thermal sensors is associated with a top of the chassis. Preferably the particular location of a second one of the plurality of thermal sensors is associated with a bottom of the chassis.

In one embodiment the backlighting system further comprises a chassis arranged to secure the plurality of luminaires, wherein one of the plurality of thermal sensors is associated with a bottom of the chassis.

In one embodiment each of the particular portions of the display associated with the luminaires are arranged horizontally, the particular portions being stacked vertically. In another embodiment the control of the output is associated with a pulse width modulation in sequence with a scanning period of the display.

Independently the invention provides for a method of backlighting comprising: providing a plurality of luminaires, each of the luminaires comprising a plurality of colored LED strings and arranged to illuminate a particular portion of a display associated therewith; sensing the illumination color of one of the provided luminaires; sensing a temperature associated with a plurality of pre-determined locations in relation to the provided plurality of luminaires, the plurality of locations being less than the plurality of luminaires; and controlling the color of each of the provided plurality of luminaires responsive to the sensed illumination color and the sensed temperature.

In one embodiment the method further comprises calculating an estimated temperature for at least one of the plurality of luminaires, the stage of controlling the color being responsive to the calculated estimated temperature. In another embodiment one of the plurality of locations is coincident with one of the provided plurality of luminaires. Preferably the one of the provided plurality of luminaires coincident with the one of the plurality of locations is the one of the provided plurality of luminaires having the sensed illumination color.

In one embodiment the method further comprises optically partitioning the provided plurality of luminaires so as to reduce optical interaction between a first of the provided plurality of luminaires and the display portion associated with a second one of the provided plurality of luminaires. In another embodiment the method further comprises: arranging each of the provided plurality of luminaires horizontally; and stacking the provided plurality of luminaires vertically. Preferably a first one of the plurality of locations is coincident with a top one of the stacked horizontally arranged luminaires. Further preferably a second one of the plurality of locations is coincident with a bottom one of the stacked horizontally arranged luminaires.

In one embodiment the method further comprises: providing a chassis; and securing the provided plurality of luminaires to the provided chassis, wherein a first one of the plurality of locations is associated with the top of the provided chassis. Preferably a second one of the plurality of locations is associated with the bottom of the provided chassis.

In one embodiment the method further comprises: providing a chassis; and securing the provided plurality of luminaires to the provided chassis, wherein one of the plurality of locations is associated with the bottom of the provided chassis.

In one embodiment the method further comprises inputting the thermodynamic relationship between the plurality of locations and each of the provided plurality of luminaires, the controlling the color being responsive to the input thermodynamic relationship. In another embodiment the stage of controlling the color comprises pulse width modulating each of the provided plurality of luminaires in sequence with a scanning period of the display.

Independently the invention provides for a backlighting system comprising: a color manager; a plurality of luminaires, each of the luminaires comprising a LED string and arranged to illuminate a particular portion of a display associated therewith; a color sensor arrange to receive light from one of the luminaires; and a plurality of thermal sensors each associated with a particular luminaire and in communication with the color manager, the plurality of thermal sensors being less than the plurality of luminaires, the color manager, responsive to the plurality of thermal sensors and the color sensor, being operable to calculate color coordinates for each of the plurality of luminaires.

Independently the invention provides for a method of backlighting comprising: providing a plurality of luminaires, each of the luminaires comprising a plurality of colored LED strings and arranged to illuminate a particular portion of a display associated therewith; sensing the illumination color of one of the provided luminaires; sensing a temperature associated with a plurality of pre-determined locations in relation to the provided plurality of luminaires, the plurality of locations being less than the plurality of luminaires, at least one of the temperature sensed pre-determined locations being associated with the illumination color sensed provided luminaire; and controlling the color of each of the provided plurality of luminaires responsive to the sensed illumination color and the sensed temperature.

Additional features and advantages of the invention will become apparent from the following drawings and description.

BRIEF DESCRIPTION OF THE DRAWINGS

For a better understanding of the invention and to show how the same may be carried into effect, reference will now be made, purely by way of example, to the accompanying drawings in which like numerals designate corresponding elements or sections throughout.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings.

DETAILED DESCRIPTION OF PREFERRED EMBODIMENTS

The present embodiments enable a backlighting system exhibiting a plurality of luminaires arranged in a plurality of horizontally arranged regions. Each of the luminaires comprises LED strings of a plurality of colors which in combination produce a white light. Optical partitions are further provided horizontally to limit any light spillover from a region to an adjacent region. A color sensor is provided, the number of color sensors being less than the number of regions. At least two thermal sensors are further provided, the number of thermal sensors being less than the number of regions. In an exemplary embodiment a thermal sensor is provided for the top region and the bottom region.

A color manager receives the output of the color sensor and the thermal sensors, and in response controls the driving signals for the luminaires responsive. In one embodiment the color manager calculates the temperature for each of the regions based on the provided thermal sensors, with the temperature of regions not provided with a thermal sensor being interpolated from the provided thermal sensors.

Thus, in an exemplary embodiment a single color sensor and two thermal sensors are provided, the two thermal sensors providing an indication of the bottom region and the top region respectively.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

Figure 1:
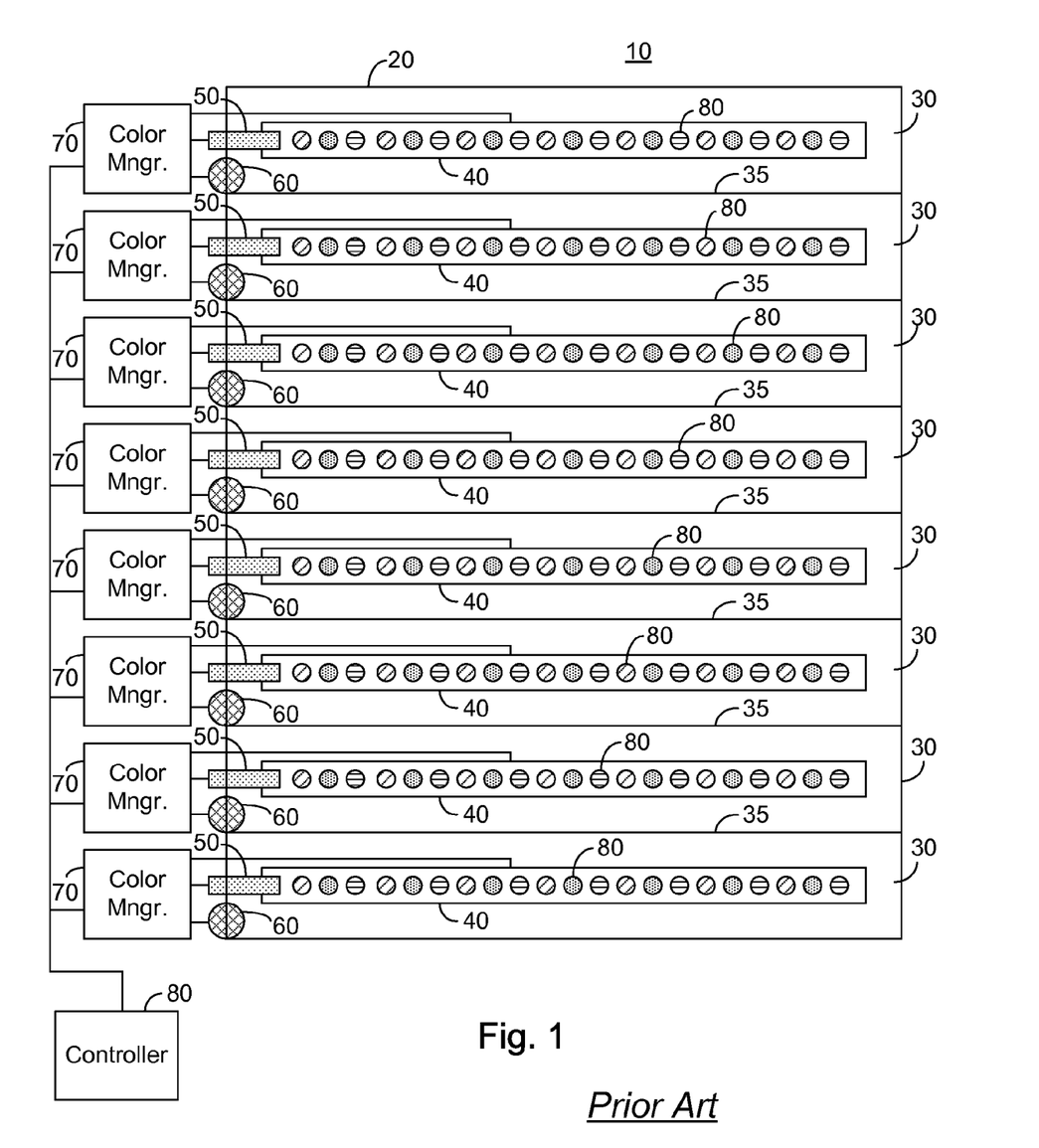
FIG. 1 illustrates a high level block diagram of a scanning backlight arrangement exhibiting a plurality of horizontally arranged regions and optical partitions between the regions according to the prior art.

FIG. 1 illustrates a high level block diagram of a scanning backlight arrangement 10 for a matrix display exhibiting a plurality of horizontally arranged regions and optical partitions between the regions according to the prior art. Scanning backlight arrangement 10 comprises: a matrix display 20 divided into a plurality of lighting regions 30 by a plurality of optical partitions 35, each of the lighting regions 30 comprising a luminaire 40, a thermal sensor 50, and a color sensor 60; a plurality of color managers 70, each of the color managers 70 being associated with a particular lighting region 30; and a controller 80. Each luminaire 40 is comprised of at least one LED string 80. In an exemplary embodiment the at least one LED string 80 comprises a red LED string, a blue LED string and a green LED string. Thermal sensors 50 may be arranged to output a signal reflective of the temperature of the LEDs of luminaire 40 or may be arranged to output a signal reflective of the temperature of a predetermined location associated with each luminaire 40. Each color manager 70 is connected to receive the output of the associated thermal sensor 50 and color sensor 60 and is connected to control a drive signal of the associated luminaire 40. Each color manager 70 further receives an illumination signal from controller 80.

In operation each color manager 70, responsive to the associated thermal sensor 50 and color sensor 60 controls the drive signal of LED strings 80 of the luminaire 40 so as to maintain an appropriate color balance. Illumination from each of the luminaires 40 is restricted to a particular lighting region 30 by optical partitions 35. In an exemplary embodiment the LED strings 80 are each controlled by an electronically controlled switch, such as a field effect transistor (FET), and LED strings 80 are each pulse width modulated via the FET so as to maintain the appropriate color balance. Controller 80 is operable to enable each luminaire 40 via the associated color manager 70 so as to synchronize the illumination of each of the lighting regions 30 with an overall scanning and refresh of matrix display 20. Scanning backlight arrangement 10 is thus operable to maintain a constant uniform color across each of the lighting regions 30, however the requirement for an individual color sensor, thermal sensor and color manager for each lighting region 30 is costly.

Figure 2A:
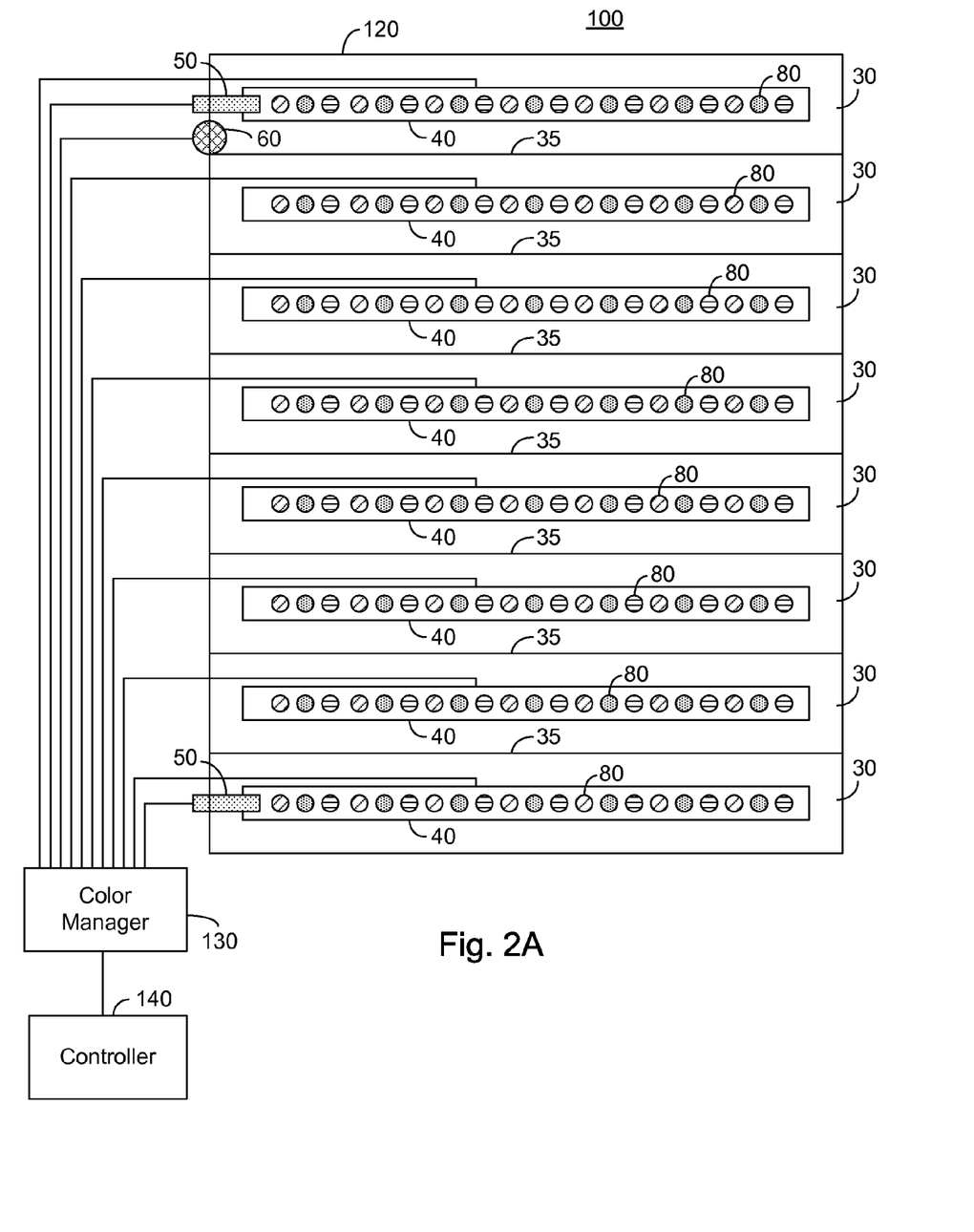
FIG. 2A illustrates a high level block diagram of a scanning backlight arrangement in accordance with a principle of the invention in which a single color sensor and two thermal sensors are provided, the thermal sensors being associated with particular luminaires.

FIG. 2A illustrates a high level block diagram of a scanning backlight arrangement 100 in accordance with a principle of the invention in which a single color sensor 60 and two thermal sensors 50 are provided, the thermal sensors being associated with particular luminaires. Scanning backlight arrangement 100 comprises: a matrix display 120 divided into a plurality of lighting regions 30 by a plurality of optical partitions 35, each of the lighting regions comprising a luminaire 40; a color manager 130; and a controller 140. Each luminaire 40 is comprised of at least one LED string 80. In an exemplary embodiment the at least one LED string 80 comprises a red LED string, a blue LED string and a green LED string. At least one lighting region 30 is provided with color sensor 60 and at least two luminaires 40 are each provided with thermal sensor 50. In an exemplary embodiment two thermal sensors 50 are provided, a first thermal sensor 50 providing temperature information regarding the LED strings 80 of the luminaire 40 associated with the top lighting region 30 and a second thermal sensor 50 providing temperature information regarding the LED strings 80 of the luminaire 40 associated with the bottom lighting region 30. Color sensor 60 is arranged to provide optical sensing information from a particular one of the lighting regions 30, and in one embodiment provides optical sensing information from a lighting region 30 having disposed therein a thermal sensor 50, however this is not meant to be limiting in any way. In another embodiment (not shown) color sensor 60 is disposed in a lighting region 30 not having a thermal sensor 50 disposed therein. Scanning backlight arrangement 100 is illustrated as having a thermal sensor 50 disposed within a top lighting region 30 and a bottom lighting region 30, however this is not meant to be limiting in any way. Temperatures sensors 50 may be provided for other lighting regions 30 and not provided in the top or bottom lighting region 30 without exceeding the scope of the invention. In another embodiment (not shown), additional thermal sensors 50 are provided. Preferably sufficient luminaires 40 are selected to receive thermal sensors 50 so as to enable the approximate determination of the temperature of the LED strings 80 in all luminaires 40 as will be explained further hereinto below.

Color manager 130 is connected to receive the output of each thermal sensor 50 and to receive the output of color sensor 60. Color manager 130 is further connected to control the drive signals of each luminaire 40 and to receive an illumination signal from controller 140.

In operation color manager 130, responsive to the at least two thermal sensors 50 and the color sensor 60 controls a drive signal associated with each LED string 80 of the luminaires 40. In one embodiment, color manager 130 calculates the temperature for each luminaire 40 for which a thermal sensor 50 is not provided and generates a control signal responsive thereto. In an exemplary embodiment the calculation involves interpolation of the temperature for each of the luminaires 40 assuming a straight line relationship based on the location of the temperatures sensors 50. In another embodiment a relationship is first determined based on thermodynamics of the design and physical layout of the monitor. In yet another embodiment the relationship is determined based on actual measurements of one or more production or engineering samples. Responsive to the calculated estimated temperatures, and the input of actual temperature measurements of thermal sensors 50, color manager 130 calculates the color coordinates of each of the LED strings 80 of each of the luminaires 40.

Color manager 130, responsive to the input from color sensor 60, and the above calculated color coordinates, is operable to calculate the appropriate driving signal for each of the LED strings 80 of each luminaire 40 so as to achieve a uniform color balance for each luminaire 40 of matrix display 120. Illumination from each of the luminaires 40 is restricted to a particular lighting region 30 by optical partitions 35. In an exemplary embodiment the LED strings 80 are each controlled by an electronically controlled switch, such as a field effect transistor (FET), and LED strings 80 are each pulse width modulated via the FET so as to maintain the appropriate color balance. In one embodiment, the LED strings 80 are pre-selected to be sufficiently uniform such that the only substantial difference in the color output between the LED strings 80 of different luminaires 40 is a consequence of temperature differences. In another embodiment, the illumination output of each LED string 80 is measured during an initial calibration stage, preferably as part of the manufacturing process, and the values are stored within color manager 130 for use in calculating the appropriate drive signal to color control each of the LED strings 80. Thus, a single color sensor 60 in coordination with at least two thermal sensors 50 are utilized to control the color of all LED strings 80 of scanning backlight arrangement 100.

Controller 140 is operable to enable each luminaire 40 via color manager 130 so as to synchronize the illumination of each of the lighting regions 30 with an overall scanning and refresh of matrix display 120. Scanning backlight arrangement 100 is thus operable to maintain a constant color across each of the lighting regions 30, without requiring an individual color sensor and thermal sensor for each lighting region 30.

The above has been described in an embodiment in which a single color sensor 60 is provided, however this is not meant to be limiting in any way. The invention is equally applicable to an embodiment in which more than one color sensor 60 is provided. In the event of a plurality of color sensors 60 being provided, an average value of the color sensors may be utilized. Alternatively, a first color sensor 60 may be utilized to control the color of a first plurality of lighting regions 30, including the lighting region comprising the first color sensor 60, and a second color sensor 60 may be utilized to control the color of a second plurality of lighting regions 30, including the lighting region comprising the second color sensor 60. Thus matrix display 120 may be subdivided into the appropriate number of groups depending on the number of color sensors 60, and each color sensor may be utilized to control one or more lighting regions 30 within the group.

The above has been described in an embodiment in which two thermal sensors 50 are provided, however this is not meant to be limiting in any way. The invention is equally applicable to an embodiment in which more than two thermal sensors 50 are provided. The temperature of the LED strings 80 within lighting regions 30 not exhibiting a thermal sensor 50 are calculated based on thermal sensors 50 of the lighting regions 30 where supplied. The respective thermal sensors 50 are utilized to determine the temperature of the associated LED strings 80 of luminaire 40 for which thermal sensor 50 is provided.

Figure 2B:
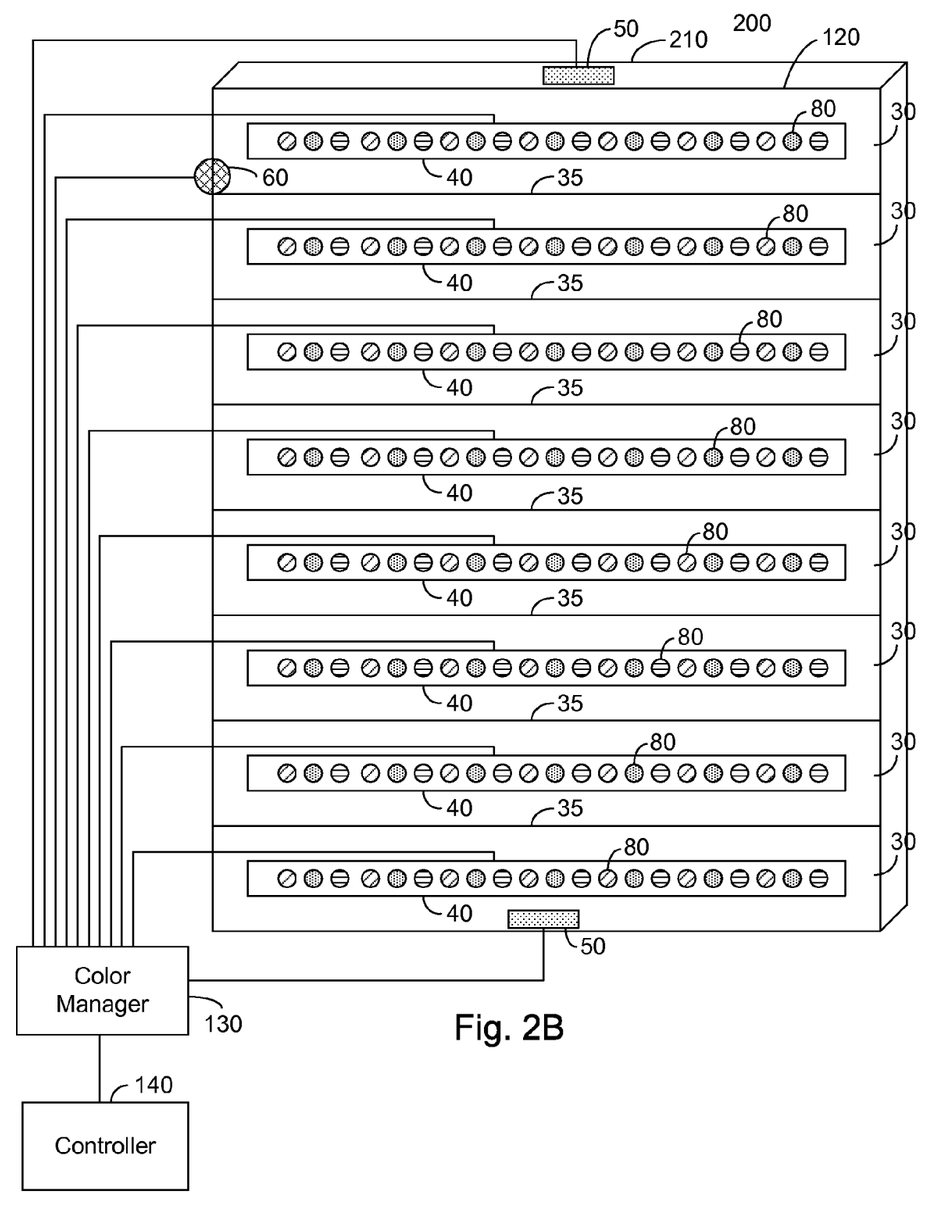
FIG. 2B illustrates a high level block diagram of a scanning backlight arrangement in accordance with a principle of the invention in which a single color sensor and two thermal sensors are provided, the thermal sensors being secured at pre-determined locations relative to the luminaires.

FIG. 2B illustrates a high level block diagram of a scanning backlight arrangement 200 in accordance with a principle of the invention in which a single color sensor 60 and two thermal sensors 50 are provided, the thermal sensors being secured at predetermined locations relative to the luminaires. Scanning backlight arrangement 200 comprises: a matrix display 120 divided into a plurality of lighting regions 30 by a plurality of optical partitions 35, each of the lighting regions comprising a luminaire 40; a color manager 130; and a controller 140. Each luminaire 40 is comprised of at least one LED string 80 and the luminaires 40 are secured within a chassis 210. In an exemplary embodiment the at least one LED string 80 comprises a red LED string, a blue LED string and a green LED string. At least one lighting region 30 is provided with color sensor 60, and at least two temperatures sensors 50 are provided secured at predetermined location relative to the plurality of luminaires 40. In an exemplary embodiment two thermal sensors 50 are provided, a first thermal sensor 50 providing temperature information associated with the top area of chassis 210 and a second thermal sensor 50 providing temperature information regarding the bottom area of chassis 210. Color sensor 60 is arranged to provide optical sensing information from a particular one of the lighting regions 30, and in one embodiment provides optical sensing information from a lighting region 30 having disposed therein a thermal sensor 50, however this is not meant to be limiting in any way. In another embodiment (not shown) color sensor 60 is disposed in a lighting region 30 not having a thermal sensor 50 disposed therein. Scanning backlight arrangement 200 is illustrated as having a thermal sensor 50 disposed within a top area of chassis 210 and a bottom area of chassis 210, however this is not meant to be limiting in any way. Temperatures sensors 50 may be provided in other areas of chassis 210 and not provided in the top or bottom areas without exceeding the scope of the invention. In another embodiment (not shown), additional thermal sensors 50 are provided. Preferably sufficient areas are selected to receive thermal sensors 50 so as to enable the approximate determination of the temperature of the LED strings 80 in all lighting regions 30 as will be explained further hereinbelow.

Color manager 130 is connected to receive the output of each thermal sensor 50 and to receive the output of color sensor 60. Color manager 130 is further connected to control the drive signals of each luminaire 40 and to receive an illumination signal from controller 140.

In operation color manager 130, responsive to the at least two thermal sensors 50 and the color sensor 60 controls a drive signal associated with each LED string 80 of the luminaires 40. In one embodiment, color manager 130 calculates an approximate temperature for each luminaire 40 and generates a control signal responsive thereto. In an exemplary embodiment the calculation involves interpolation of the temperature for each of the luminaires 40 based on the location of the temperatures sensors 50. In another embodiment a relationship is first determined based on thermodynamics of the design and physical layout of the monitor. In yet another embodiment the relationship is determined based on actual measurements of one or more production or engineering samples. Responsive to the calculated estimated temperatures color manager 130 calculates the color coordinates of each of the LED strings 80 of each of the luminaires 40.

Color manager 130, responsive to the input from color sensor 60, and the above calculated color coordinates, is operable to calculate the appropriate driving signal for each of the LED strings 80 of each luminaire 40 so as to achieve a uniform color balance for each luminaire 40 of matrix display 120. Illumination from each of the luminaires 40 is restricted to a particular lighting region 30 by optical partitions 35. In an exemplary embodiment the LED strings 80 are each controlled by an electronically controlled switch, such as a field effect transistor (FET), and LED strings 80 are each pulse width modulated via the FET so as to maintain the appropriate color balance. In one embodiment, the LED strings 80 are pre-selected to be sufficiently uniform such that the only substantial difference in the color output between the LED strings 80 of different luminaires 40 is a consequence of temperature differences. In another embodiment, the illumination output of each LED string 80 is measured during an initial calibration stage, preferably as part of the manufacturing process, and the values are stored within color manager 130 for use in calculating the appropriate drive signal to color control each of the LED strings 80. Thus, a single color sensor 60 in coordination with at least two thermal sensors 50 are utilized to control the color of all LED strings 80 of scanning backlight arrangement 200.

Controller 140 is operable to enable each luminaire 40 via color manager 130 so as to synchronize the illumination of each of the lighting regions 30 with an overall scanning and refresh of matrix display 120. Scanning backlight arrangement 200 is thus operable to maintain a constant color across each of the lighting regions 30, without requiring an individual color sensor for each lighting region 30 and an individual thermal sensor associated with each luminaire 40.

The above has been described in an embodiment in which a single color sensor 60 is provided, however this is not meant to be limiting in any way. The invention is equally applicable to an embodiment in which more than one color sensor 60 is provided. In the event of a plurality of color sensors 60 being provided, an average value of the color sensors may be utilized. Alternatively, a first color sensor 60 may be utilized to control the color of a first plurality of lighting regions 30, including the lighting region comprising the first color sensor 60, and a second color sensor 60 may be utilized to control the color of a second plurality of lighting regions 30, including the lighting region comprising the second color sensor 60. Thus matrix display 120 may be subdivided into the appropriate number of groups depending on the number of color sensors 60, and each color sensor may be utilized to control one or more lighting regions 30 within the group.

The above has been described in an embodiment in which two thermal sensors 50 are provided, however this is not meant to be limiting in any way. The invention is equally applicable to an embodiment in which more than two thermal sensors 50 are provided. The temperature of the LED strings 80 are calculated based on inputs from provided thermal sensors 50 and their associated locations in relation to luminaires 40.

Figure 3A:
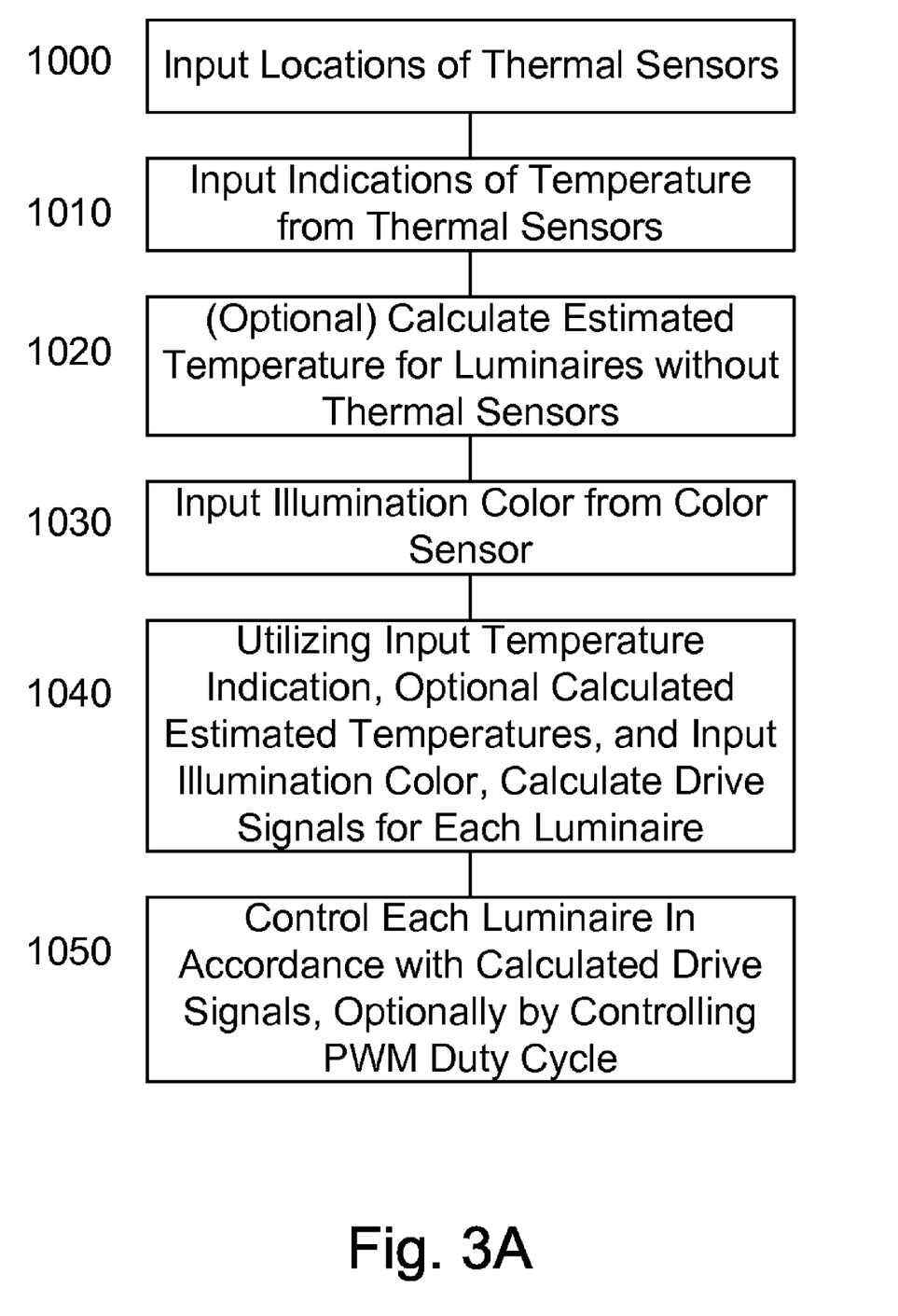
FIG. 3A illustrates a high level flow chart of the operation of the color manager of FIG. 2A to control the color of the luminaire of each lighting region based on the color sensor and thermal sensors in accordance with a principle of the invention.

FIG. 3A illustrates a high level flow chart of the operation of color manager 130 of FIG. 2A to control the color of the luminaire 40 of each lighting region 30 based on color sensor 60 and temperatures sensors 50 in accordance with a principle of the invention. In stage 1000 the physical locations of the luminaires 40 having associated therewith a thermal sensor 50 are input, and the physical relationship between the luminaires 40 not exhibiting a thermal sensor 50 and the provided thermal sensors 50 is input. Thus, as indicated above, at least two thermal sensors 50 are provided, and stage 1000 further provides full location information regarding luminaires 40 of lighting regions 30 for which a thermal sensor 50 is not provided and the interrelation thereof. In one embodiment, as described above, the physical location enables a straight line relationship to be calculated for all luminaires 40 located between the luminaires 40 provided with thermal sensors 50. In another embodiment, the physical location further comprises a pre-determined thermodynamic relationship between the temperatures of the luminaires 40 provided with thermal sensors and all other luminaires 40 of scanning backlight arrangement 100. The pre-determined relationship may be determined based on the design and physical layout or based on actual measurement of one or more production or engineering samples. In an exemplary embodiment thermal sensors 50 are provided in a top and bottom luminaire 40 in a direction of normal heat flow. In the event that a plurality of color sensors 60 is provided, their physical location and relationship to each of the light regions 30 are input.

In stage 1010, a reading of each thermal sensor 50 is input, the reading being associated with the LED temperature of a LED string 80 of the luminaire 40 to which thermal sensor 50 is associated. In optional stage 1020 an estimated temperature is calculated for each luminaire 40 of each lighting zone 30 not provided with a thermal sensor 50. In an exemplary embodiment the calculation involves interpolation of the temperature for each of the luminaires 40 located between the luminaires 40 provided with thermal sensors 50 assuming a linear temperature relationship. In another embodiment the thermodynamic relationship input in stage 1000 is utilized to calculate the estimated temperatures.

In stage 1030 the illumination color is input from color sensor 60. In an embodiment in which a plurality of color sensors 60 are provided, each of the outputs are input, and assigned to subgroups of regions or averaged as described above. In stage 1040, utilizing the temperature indications input in stage 1010, the optional estimated temperatures calculated in stage 1020 and the illumination color input in stage 1030, the drive signals to control the color of each luminaire 40 are calculated. In one embodiment the drive signals are calculated by estimating the lumen output fractions and chromaticity coordinates associated with LED light sources constituting each LED string 80 based on the input or calculated estimated temperature, respectively, and adjusting a PWM signal responsive to input from color sensor 60. In stage 1050 each luminaire 40 is controlled in accordance with the calculate drive signal of stage 1040, preferably by adjusting the PWM duty cycle associated with each LED string 80 of each luminaire 40. In an exemplary embodiment the drive signals are output as PWM control signals to enable and disable LED strings 80.

Figure 3B:
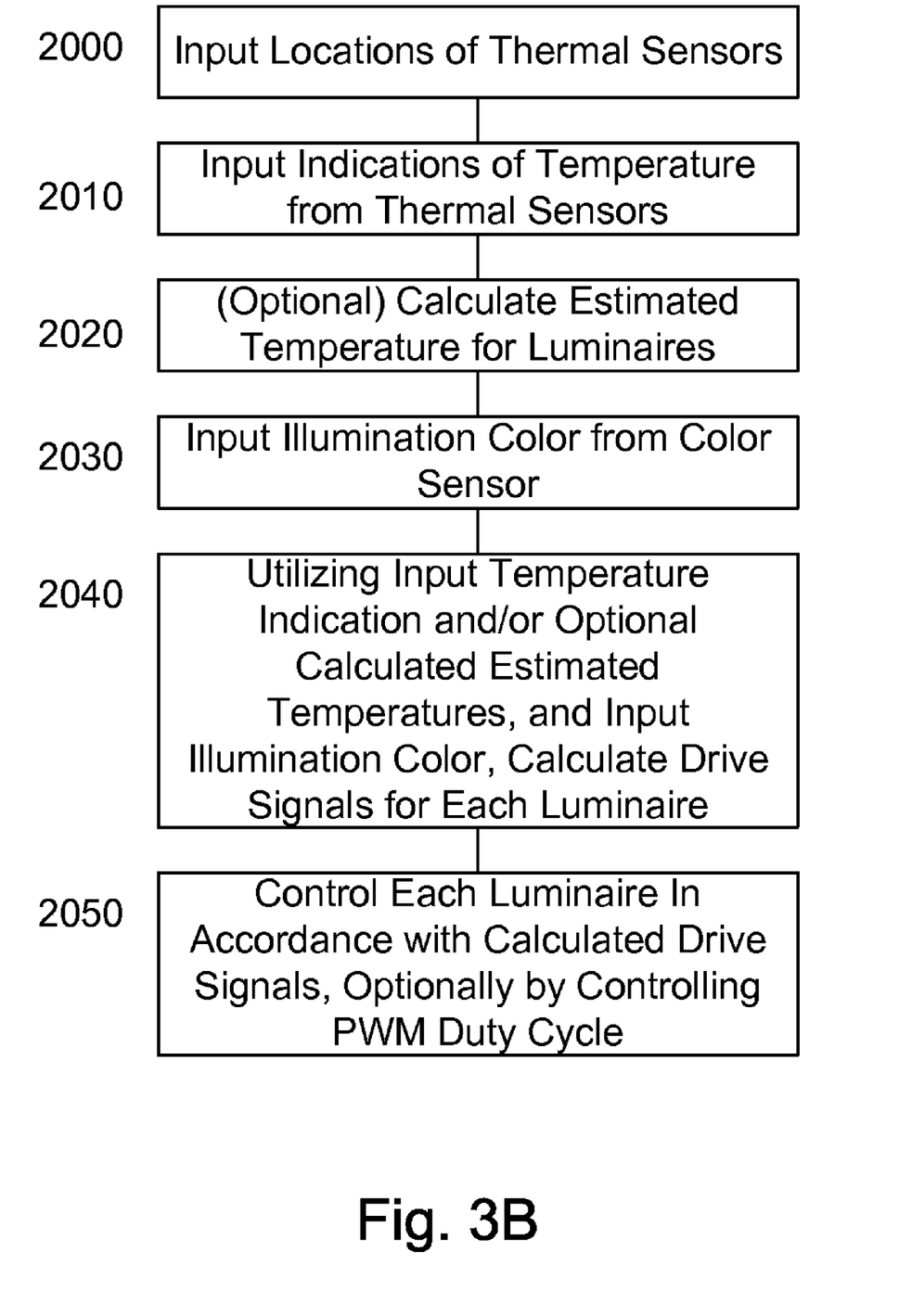
FIG. 3B illustrates a high level flow chart of the operation of the color manager of FIG. 2B to control the color of the luminaire of each lighting region based on the color sensor and thermal sensors in accordance with a principle of the invention.

FIG. 3B illustrates a high level flow chart of the operation of color manager 130 of FIG. 2B to control the color of the luminaire 40 of each lighting region 30 based on color sensor 60 and temperatures sensors 50 in accordance with a principle of the invention. In stage 2000 the physical locations of the thermal sensors 50 are input, and the thermodynamic relationship between luminaires 40 and the provided thermal sensors 50 is input. In one embodiment, as described above, the physical location enables a straight line temperature relationship to be calculated for all luminaires 40. The thermodynamic relationship may be determined based on the design and physical layout or based on actual measurement of one or more production or engineering samples. In an exemplary embodiment thermal sensors 50 are provided in a top and bottom location of chassis 210 secured at particular locations relative to the plurality of luminaires 40, preferably in a direction of normal heat flow. In the event that a plurality of color sensors 60 is provided, their physical location and relationship to each of the light regions 30 are input.

In stage 2010, a reading from each thermal sensor 50 is input. In optional stage 2020 an estimated temperature is calculated for each luminaire 40 of each lighting zone 30. In an exemplary embodiment the calculation involves interpolation of the temperature for each of the luminaires 40 located between the thermal sensors 50 assuming a linear temperature relationship. In another embodiment the thermodynamic relationship input in stage 2000 is utilized to calculate the estimated temperatures.

In stage 2030 the illumination color is input from color sensor 60. In an embodiment in which a plurality of color sensors 60 are provided, each of the outputs are input, and assigned to subgroups of regions or averaged as described above. In stage 2040, utilizing the temperature indications input in stage 2010, the optional estimated temperatures calculated in stage 2020 and the illumination color input in stage 2030, the drive signals to control the color of each luminaire 40 are calculated. In one embodiment the drive signals are calculated by estimating the lumen output fractions and chromaticity coordinates associated with LED light sources constituting each LED string 80 based on the calculated estimated temperature, and adjusting a PWM signal responsive to input from color sensor 60. In stage 2050 each luminaire 40 is controlled in accordance with the calculate drive signal of stage 2040, preferably by adjusting the PWM duty cycle associated with each LED string 80 of each luminaire 40. In an exemplary embodiment the drive signals are output as PWM control signals to enable and disable LED strings 80.

Thus the present embodiments enable a backlighting system exhibiting a plurality of luminaires arranged in a plurality of horizontally arranged regions. Each of the luminaires comprises LED strings of a plurality of colors which in combination produce a white light. Optical partitions are further provided horizontally to limit any light spillover from a region to an adjacent region. A color sensor is provided, the number of color sensors being less than the number of regions. At least two thermal sensors are further provided, the number of thermal sensors being less than the number of regions. In an exemplary embodiment a thermal sensor is provided for the top region and the bottom region.

A color manager receives the output of the color sensor and the thermal sensors, and in response controls the driving signals for the luminaires responsive. In one embodiment the color manager calculates the temperature for each of the regions based on the provided thermal sensors, with the temperature of regions not provided with a thermal sensor being interpolated from the provided thermal sensors.

Thus, in an exemplary embodiment a single color sensor and two thermal sensors are provided, the two thermal sensors providing an indication of the bottom region and the top region respectively.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable subcombination.

Unless otherwise defined, all technical and scientific terms used herein have the same meanings as are commonly understood by one of ordinary skill in the art to which this invention belongs. Although methods similar or equivalent to those described herein can be used in the practice or testing of the present invention, suitable methods are described herein.

All publications, patent applications, patents, and other references mentioned herein are incorporated by reference in their entirety. In case of conflict, the patent specification, including definitions, will prevail. In addition, the materials, methods, and examples are illustrative only and not intended to be limiting.

It will be appreciated by persons skilled in the art that the present invention is not limited to what has been particularly shown and described hereinabove. Rather the scope of the present invention is defined by the appended claims and includes both combinations and subcombinations of the various features described hereinabove as well as variations and modifications thereof which would occur to persons skilled in the art upon reading the foregoing description and which are not in the prior art.

We claim:

1. A backlighting system for use with a display exhibiting a plurality of lighting regions, the system comprising:
   a color manager;
   a plurality of luminaires each exhibiting an optical output, each of said luminaires comprising a plurality of colored LED strings and arranged to illuminate a unique one of the plurality of lighting regions of the display with the optical output of the respective luminaire, the optical output of each of the respective luminaires restricted to the respective unique lighting region;
   a color sensor arranged to receive light from one of the plurality of lighting regions; and
   a plurality of thermal sensors in communication with said color manager, each of said thermal sensors secured at a particular location relative to said plurality of luminaires and spatially separated from all other of said plurality of thermal sensors, said plurality of thermal sensors being fewer in number than said plurality of luminaires;
   said color manager, responsive to said plurality of thermal sensors and said color sensor, operative to calculate an estimated thermal temperature for at least one of said plurality of luminaires and control a drive signal of each of said plurality of luminaires so as to maintain a uniform color, said controlled drive signal being responsive to said calculated estimated thermal temperature.

2. A backlighting system according to claim 1, wherein at least one of said plurality of thermal sensors is associated with a particular luminaire.

3. A backlighting system according to claim 2, wherein said color sensor receives light from said lighting region illuminated by said particular luminaire having associated therewith said at least one thermal sensor.

4. A backlighting system according to claim 1, further comprising a plurality of optical partitions, each of said optical partitions arranged between two of said plurality of luminaires so as to reduce optical interaction between a first of said two luminaires and the unique display portion illuminated by a second of said two luminaires, thereby restricting the optical output of each of said luminaires to the respective unique lighting region.

5. A backlighting system according to claim 1, wherein each of said plurality of luminaires is arranged horizontally, said plurality of luminaires being stacked vertically.

6. A backlighting system according to claim 5, wherein said particular location of one of said plurality of thermal sensors is associated with a top one of said horizontally arranged stacked plurality of luminaires.

7. A backlighting system according to claim 5, wherein said particular location of one of said plurality of thermal sensors is associated with a bottom one of said horizontally arranged stacked plurality of luminaires.

8. A backlighting system according to claim 1, further comprising a chassis arranged to secure said plurality of luminaires, wherein said particular location of a first one of said plurality of thermal sensors is associated with a top of said chassis.

9. A backlighting system according claim 8, wherein said particular location of a second one of said plurality of thermal sensors is associated with a bottom of said chassis.

10. A backlighting system according to claim 1, further comprising a chassis arranged to secure said plurality of luminaires, wherein one of said plurality of thermal sensors is associated with a bottom of said chassis.

11. A backlighting system according to claim 1, wherein each of the lighting regions of the display is arranged horizontally, the horizontally arranged lighting regions being stacked vertically.

12. A backlighting system according to claim 1, wherein said control of the output is associated with a pulse width modulation in sequence with a scanning period of the display.

13. A method of backlighting comprising:
   providing a plurality of luminaires, each of said provided luminaires comprising a plurality of colored LED strings and exhibiting an optical output;
   arranging each of said provided luminaires to illuminate, with the respective optical output, a unique one of a plurality of lighting regions of a display associated therewith;
   restricting the optical output of each of said provided luminaires to the respective unique lighting region;
   sensing the illumination color of one of the lighting regions;
   sensing a plurality of thermal temperatures each associated with a particular one of a plurality of pre-determined locations in relation to said provided plurality of luminaires, each of said plurality of pre-determined locations being spatially separated from all other of said plurality of pre-determined locations, said plurality of locations being less in number than said plurality of luminaires;
   calculating an estimated thermal temperature for at least one of said provided plurality of luminaires responsive to said sensed plurality of thermal temperatures; and
   controlling the color of each of said provided plurality of luminaires responsive to said sensed illumination color and said calculated estimated thermal temperature.

14. A method of backlighting according to claim 13, wherein one of said plurality of pre-determined locations is coincident with one of said provided plurality of luminaires.

15. A method of backlighting according to claim 14, wherein said one of said provided plurality of luminaires coincident with said one of said plurality of pre-determined locations is said luminaire illuminating said lighting region having said sensed illumination color.

16. A method of backlighting according to claim 13, wherein said restricting the optical output comprises:
   optically partitioning said provided plurality of luminaires so as to reduce optical interaction between a first of said provided plurality of luminaires and the lighting region illuminated by a second one of said provided plurality of luminaires.

17. A method of backlighting according to claim 13, further comprising:
   arranging each of said provided plurality of luminaires horizontally; and
   stacking said provided plurality of luminaires vertically.

18. A method of backlighting according to claim 17, wherein a first one of said plurality of pre-determined locations is coincident with a top one of said stacked horizontally arranged luminaires.

19. A method of backlighting according to claim 18, wherein a second one of said plurality of pre-determined locations is coincident with a bottom one of said stacked horizontally arranged luminaires.

20. A method of backlighting according to claim 13, further comprising:
providing a chassis; and
securing said provided plurality of luminaires to said provided chassis, wherein a first one of said plurality of pre-determined locations is associated with the top of said provided chassis.

21. A method of backlighting according to claim 20, wherein a second one of said plurality of pre-determined locations is associated with the bottom of said provided chassis.

22. A method of backlighting according to claim 13, further comprising:
providing a chassis; and
securing said provided plurality of luminaires to said provided chassis, wherein one of said plurality of pre-determined locations is associated with the bottom of said provided chassis.

23. A method of backlighting according to claim 13, further comprising:
inputting the thermodynamic relationship between said plurality of pre-determined locations and each of said provided plurality of luminaires, said controlling the color being responsive to said input thermodynamic relationship.

24. A method of backlighting according to claim 13, wherein said controlling the color comprises pulse width modulating each of the provided plurality of luminaires in sequence with a scanning period of the display.

25. A backlighting system for use with a display exhibiting a plurality of lighting regions, the system comprising:
a color manager;
a plurality of luminaires each exhibiting an optical output, each of said luminaires comprising a LED string arranged to illuminate a unique one of the plurality of lighting regions of the display with the respective optical output thereof, each of said luminaires optically isolated from all lighting regions of the display other than the respective unique one;
a color sensor arrange to receive light from only one of the luminaires; and
a plurality of thermal sensors each associated with a particular luminaire and in communication with said color manager, said plurality of thermal sensors being less in number than said plurality of luminaires, each of said plurality of thermal sensors spatially separated from all other of said plurality of thermal sensors,
said color manager, responsive to said plurality of thermal sensors and said color sensor, operative to:
calculate, responsive to said plurality of thermal sensors, an estimated thermal temperature for at least one of said plurality of luminaires for which a thermal sensor is not associated; and
calculate, responsive to said color sensor and said calculated estimated thermal temperature, color coordinates for each of said plurality of luminaires.

26. A method of backlighting for use with a display having a plurality of lighting regions, the method comprising:
providing a plurality of luminaires each exhibiting an optical output;
arranging each of said provided plurality of luminaires to illuminate a unique one of the plurality of lighting regions of the display with the respective optical output thereof;
optically isolating each of said provided luminaires from all lighting regions of the display other than said respective unique lighting region;
sensing the illumination color of only one of said provided luminaires;
sensing a thermal temperature associated with a plurality of pre-determined locations in relation to said provided plurality of luminaires, the number of said plurality of locations being less than the number of said plurality of luminaires, each of said plurality of pre-determined locations being spatially separated from all other of said plurality of pre-determined locations, at least one of said temperature sensed pre-determined locations being associated with said illumination color sensed provided luminaire;
calculating an estimated thermal temperature for at least one of said provided plurality of luminaires responsive to said sensed thermal temperature of said plurality of pre-determined locations; and
controlling the color of each of said provided plurality of luminaires responsive to said sensed illumination, and said calculated estimated thermal temperature.

* * * * *